March 30, 1926.  1,578,775
W. C. SPECK
CULTIVATOR ATTACHMENT
Filed Feb. 24, 1925
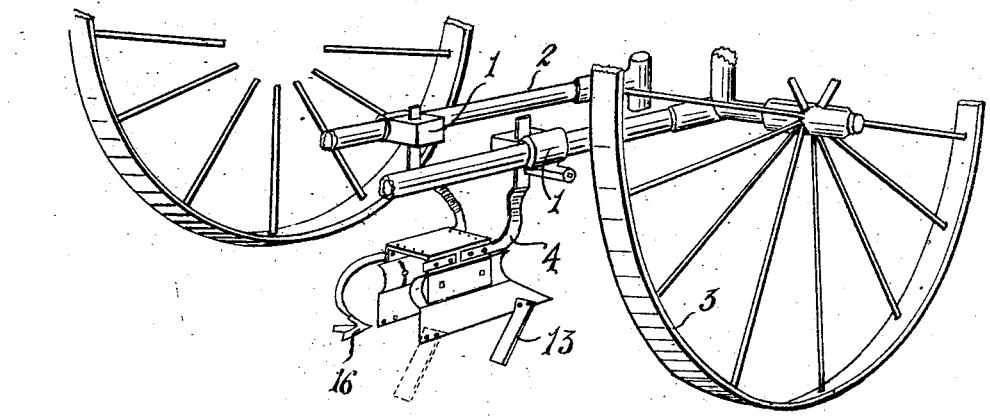
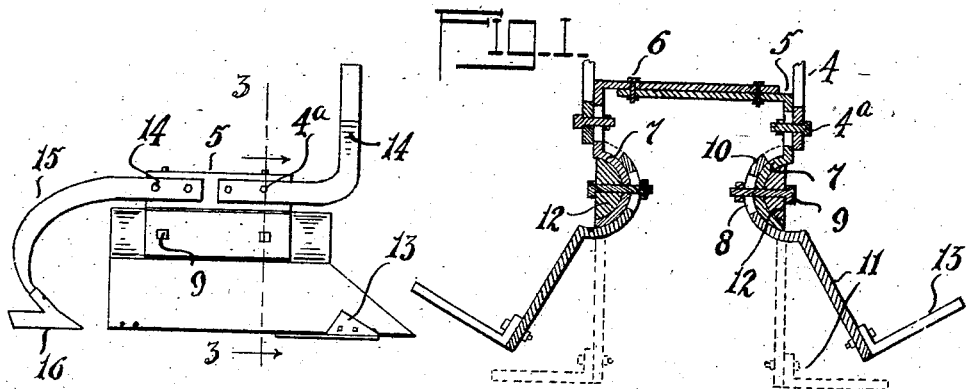
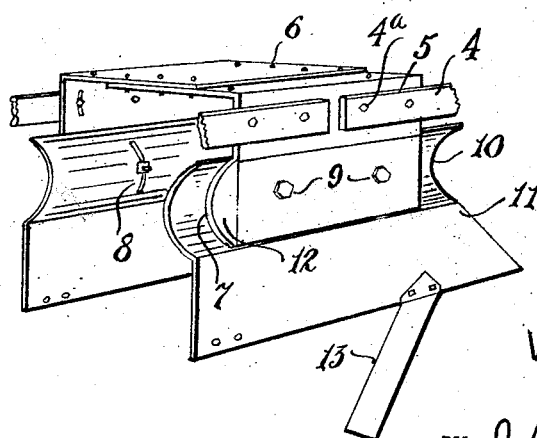
Wm. C. Speck
INVENTOR.
BY John M. Spellman
ATTORNEYS.

Patented Mar. 30, 1926.

1,578,775

UNITED STATES PATENT OFFICE.

WILLIAM C. SPECK, OF LAMESA, TEXAS.

CULTIVATOR ATTACHMENT.

Application filed February 24, 1925. Serial No. 11,019.

*To all whom it may concern:*

Be it known that I, WILLIAM C. SPECK, a citizen of the United States, residing at Lamesa, in the county of Dawson and State of Texas, have invented certain new and useful Improvements in Cultivator Attachments, of which the following is a specification.

This invention relates to improvements in agricultural implements and refers more particularly to an attachment for cultivators.

The particular object of the invention is to provide a cultivator attachment for the cutting of weeds, grass and vegetation on the sides of a hill or ridge between furrows in the cultivation of cotton, corn or the like, and for cultivating between the rows of growing crops. It is also advantageous in harvesting beans, peas, etc., in clipping the vines close to the ground.

Another object of the invention is that it can be attached to any standard type of cultivator and in addition to its vegetation and weed cutting feature will maintain the hill formation by replacing the soil cut away by the weed cutting operation.

The attachment is also adjustable to various angles for row space and size of ridge or hill.

The new and improved cultivator attachment will be better understood by reference to the following description, in connection with the accompanying drawings, forming part hereof, and in which—

Figure 1 is a perspective view of a cultivator of standard type and embodying the invention, with parts broken away.

Figure 2 is a side elevational view of the attachment removed from the cultivator.

Figure 3 is a vertical sectional view of the attachment taken on line 3—3 of Figure 2; and Figure 4 is an enlarged perspective view of the attachment with parts broken away.

Referring to the drawings more in detail, 1—1 represents a common form of sleeve attached to the beams 2—2 of a cultivator of standard make and supported upon the wheels 3—3. The attachment has upwardly extended arms 4—4 curved in the manner shown and removably connected to and rigidly supported by the sleeves 1—1.

Each arm 4 is connected by bolts 4ª to angular plates 5 which plates in pairs comprise the main body portion or frame of the attachment. The plates as will be noticed, particularly in Figure 3, are lapped one over the other and provided with bolts 6—6 for holding the same in adjusted position.

A depending side is formed with the outer end of each plate having formed with the lower end thereof a concaved or inwardly curved portion 7. Each curved portion 7 is received in a curved portion 10 of a runner guide 11. The members 10 are provided with segmental slots, whereas the members 7 are provided with openings for the reception of the bolts 9, as is better illustrated in Figure 3 of the drawing. The runners are for the purpose of aligning the attachment with the rows as a guide, protecting the plants from too close cultivation and for slightly breaking the soil. In the groove formed by the curved end or portion 10 of each runner 11 is a convex surfaced bar 12, the bolts 9—9 being passed through this bar and the portions 7—7 and 10—10. It will thus be seen that the runners 11—11 carrying the knives 13—13 may be adjusted to any angle on the side of a ridge or hill of plants to remove vegetation therefrom, or for cutting the weeds and grass in a furrow.

Since more or less soil will be removed or disturbed on the hills or ridges in the cultivation of the plants and will fall into the furrows between the hills, there is provided and attached to the rear of the members 5 by bolts 14, a curved shank 15 carrying a plow shovel. This shovel will maintain the hill formation by casting up the soil thrown into the furrows, as these shovels it will be noticed travel behind the runners and knives.

What is claimed is:

A cultivator attachment of the character described comprising a frame consisting of a pair of angular plates, means for adjustably connecting said plates together, means for connecting said plates to a cultivator curved portions formed with the outer sides of said plates, runner guards, curved portions formed with the upper ends of said runner guards and adapted to receive said curved portions of said plates, a bar seated within the curved portion of each plate said bars and curved portions having openings therein, and bolts extending through the openings in said bars and curved portions for adjustably connecting said runner guards to said frame.

In testimony whereof I have signed my name to this specification.

WILLIAM C. SPECK.